United States Patent
Stoewe

(10) Patent No.: US 6,976,734 B2
(45) Date of Patent: Dec. 20, 2005

(54) VEHICLE SEAT AND ASSOCIATED AIR CONDITIONING APPARATUS

(75) Inventor: Stefan Stoewe, Mering (DE)

(73) Assignee: W.E.T. Automotive Systems AG, (DE)

( * ) Notice: Subject to any disclaimer, the term of this patent is extended or adjusted under 35 U.S.C. 154(b) by 0 days.

(21) Appl. No.: 10/738,495

(22) Filed: Dec. 17, 2003

(65) Prior Publication Data

US 2004/0160093 A1    Aug. 19, 2004

(30) Foreign Application Priority Data

Dec. 18, 2002 (DE) ................................ 102 59 621

(51) Int. Cl.⁷ .............................................. A47C 7/72
(52) U.S. Cl. .......................... 297/180.14; 297/180.13; 297/452.42; 297/452.46; 297/180.1
(58) Field of Search ..................... 297/180.1, 180.13, 297/180.14, 452.42, 452.46, 452.47

(56) References Cited

U.S. PATENT DOCUMENTS

| 4,685,727 | A | * | 8/1987 | Cremer et al. .......... 297/180.14 |
| 6,048,024 | A | | 4/2000 | Wallman |
| 6,145,925 | A | * | 11/2000 | Eksin et al. ............ 297/180.14 |
| 6,189,966 | B1 | * | 2/2001 | Faust et al. ............ 297/180.14 |
| 6,196,627 | B1 | * | 3/2001 | Faust et al. ............ 297/180.14 |
| 6,277,023 | B1 | * | 8/2001 | Schwarz ..................... 454/120 |
| 6,682,140 | B2 | * | 1/2004 | Minuth et al. .......... 297/180.14 |

FOREIGN PATENT DOCUMENTS

DE          196 34 370 A1    3/1998

* cited by examiner

*Primary Examiner*—Laurie K. Cranmer

(57) ABSTRACT

A vehicle seat with a backrest (16) that has a backrest cushion (18) and a rear backrest cover (20), and an air-handling device that is associated with the backrest (16) and is connected to an air distribution device (30, 32) in the seat. The rear backrest cover (20) is at least partially air permeable, and covers at least one passage (27) of the air-handling device (23). The air exchanged between the environment and the air-handling device (23) passes for the most part through the air-permeable regions of the backrest cover (20).

16 Claims, 1 Drawing Sheet

VEHICLE SEAT AND ASSOCIATED AIR CONDITIONING APPARATUS

TECHNICAL FIELD

The invention relates to a vehicle seat and, more particularly, concerns a vehicle seat having a backrest cushion and cover, and an air-handling device associated with the backrest and connected to an air distribution device in the seat.

BACKGROUND OF THE INVENTION

Air conditioned seats are known from the automotive industry and aircraft construction. A customary arrangement consists of a seat provided with at least one device for the supply of air whose seat and backrest surfaces are each provided on the side facing the passengers with air outlets or with an air-permeable fabric structure. The air supply device typically includes a fan arranged in the seat surface and one in the backrest surface, each of which draws in air from the environment and directs it through air ducts in the seat to the surfaces facing a person sitting in the seat.

U.S. Pat. No. 6,048,024 describes a ventilated seat that is equipped with a fan device beneath a seat surface and one in a backrest surface. Each of the fan devices draws air out of the seat through openings in the seat and backrest surfaces and discharges it to the environment.

A ventilated vehicle seat is also known from DE 196 34 370 A1. The vehicle seat includes a backrest that has a backrest cushion and a backrest cover that covers the rear side thereof. The backrest further includes a ventilating device for the backrest cushion that has a hollow space extending between the backrest cushion and the backrest cover and, located in the hollow space, a fan with a fan inlet and fan outlet. The fan is arranged in the bottom part of the hollow space closer to the underside of the backrest, and its fan input is connected to an air shaft that runs along the backrest cover to the underside of the backrest where it has an air inlet.

Such conventional conditioned seats have drawbacks in that the fans and air ducts create undesirable levels of noise. Thus, there exists a need for an air conditioned seat, or an air conditioning apparatus for a ventilated seat, that is characterized by simple, low-noise and draft-free air circulation.

SUMMARY OF THE INVENTION

The present invention provides a vehicle seat with a backrest cushion and a rear backrest cover, and an air-handling device associated with the backrest and connected to an air-distribution device in the seat. The rear backrest cover is at least partially air permeable in that it covers at least one passage of the air-handling device, and the air exchange between the environment and the air-handling device passes, to a great extent, through the air-permeable regions of the backrest cover. The backrest cover can, in particular, take the form of a woven or knitted textile which covers a ventilating fan arranged in the backrest. With a large-area textile backrest cover of air-permeable upholstery material of this nature, a significant reduction in bothersome intake noise can be achieved since it is possible to eliminate air ducts of any sort in the backrest such as are necessary in conventional backrest covers of rigid plastic.

In one embodiment, at least one fan is located in a lower region of the backrest near the floor. Accordingly, at least one lower region of the backrest cover near the floor is air permeable. Normally, uncooled air that is obtained and drawn in from lower regions of the passenger compartment is used for seat ventilation. These regions near the floor have the lowest temperatures in strong sunlight. Thus, the temperatures in vehicles parked in the blazing sun rise to over 40° C. in the interior of the backrest and over 65° C. in the head space, while temperatures in the foot space rarely rise above 30° C. Hence the air drawn in by the fan generally is significantly cooler than the air in the vicinity of the outlet openings at the backrest. Alternatively, essentially the entire backrest cover can be designed to be air permeable so that the air is also drawn in from higher regions of the vehicle interior. Since the airflow normally becomes weaker as the distance to the fan increases, even in this design the bulk of the intake air is obtained from lower regions near the floor.

In another embodiment of the invention, an air-permeable spacer layer, which can take the form of a knit spacer for example, can be provided between the intake opening of the at least one fan and the fabric backrest cover. In this way, it is possible to prevent the fabric backrest cover from penetrating the blower region of the fan. Furthermore, this knit spacer can provide for radial redirection of the intake air and prevent the fan, which preferably is of relatively simple design, from drawing in air from only a small area of the backrest.

With the embodiment of the backrest cover according to the invention, the design of the backrest need not be changed, or need only be changed minimally, from that of conventional vehicle seats. Nor is the feel or texture thereof significantly changed or impaired. The back of the backrest cover is preferably made opaque so that the fan is not seen by the rear seat passengers.

The elimination of a rigid backrest cover with air ducts integrated therein or covered thereby makes possible a relatively slim vehicle seat that, despite the air conditioning apparatus located therein, in no way limits the foot room for an additional passenger located behind the air conditioned vehicle seat.

In another embodiment of the invention, the fabric backrest cover has a filter effect for the indrawn air so that particles and dust are kept out of the blower region. Since relatively large particles and dust should not be emitted from the vehicle seat air outlets toward the passenger, these undesirable foreign materials would deposit in the backrest of the seat and build up there after a relatively long period of operation. With a relatively heavy accumulation of dirt after a fairly long period of time, this would increasingly degrade the flow conditions in the air ducts, which would also impair the air conditioning effect. These disadvantages can be prevented by an appropriately fine-meshed design of the textile fabric of the backrest cover.

Even with a very thin fabric, the backrest cover according to the invention makes possible good noise suppression for the rear seat passengers, since there are no hollow spaces in air ducts, which could constitute a source for resonances. Moreover, only relatively low flow velocities occur, so for this reason as well, scarcely any bothersome noise emissions occur. Radiated noise can be further reduced by providing the textile fabric of the backrest cover with a noise-suppressing structure and possibly by making it somewhat thicker. Under certain circumstances, such a noise-suppressing structure can even have a noise-absorbing effect, thus effectively reducing the noise level in the vehicle interior.

The diffuse intake over at least a lower region or over nearly the entire rear side of the backrest has the result that no high local flow velocities arise at an air inlet. Any noticeable intake draft is avoided in this way.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiment illustrated in greater detail in the accompanying figure and described below by way of examples of the invention wherein.

DESCRIPTION OF THE PREFERRED EMBODIMENT(S)

Figure 1:
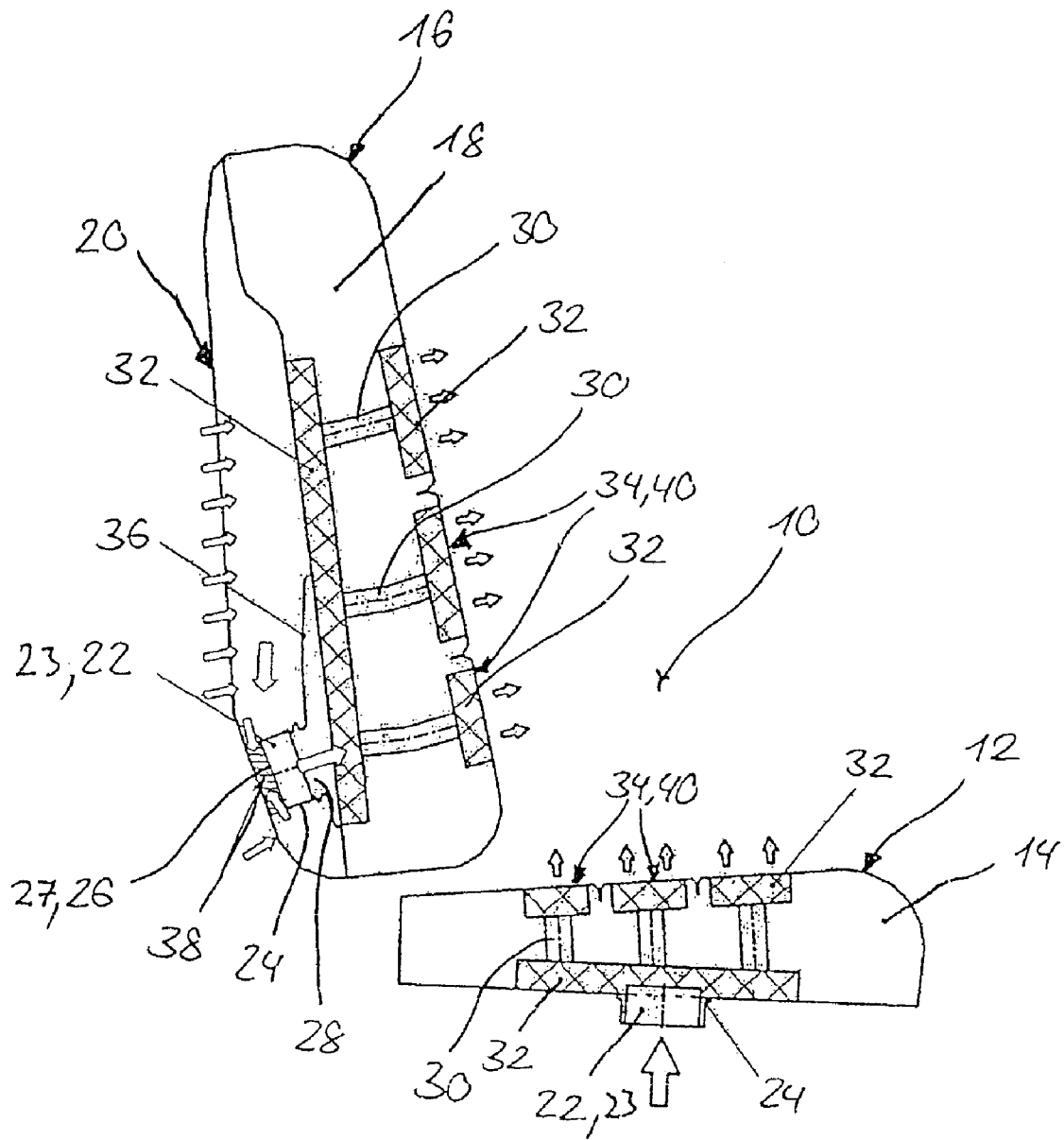
FIG. 1 shows a schematic cross-sectional representation of a vehicle seat according to one embodiment of the present invention.

While the present invention is described with regard to a motor vehicle seat, it may be adapted and utilized for other seating applications including airplane seats and theater seating, for example. Additionally, in the following description, various operating parameters and components are described for one constructed embodiment. These specific parameters and components are included as examples and are not meant to be limiting.

FIG. 1 shows a schematic representation of an air conditioned seat 10 in accordance with one embodiment of the invention. The seat 10 comprises an approximately horizontal seat surface 12 and a backrest 16 that is attached thereto in either a fixed or rotatable manner. To ensure the desired seating comfort, the seat surface 12 has a resilient seat cushion 14 and the backrest 16 has a resilient backrest cushion 18. In particular, the seat cushion 14 and backrest cushion 18 may be made of foam or the like. If desired, a spring core may also be provided in each of these. An underside of the seat surface 12 is anchored to a floor—possibly in a sliding manner—by means of a seat frame (not shown). Such a seat 10 in accordance with the invention may be used for example in a vehicle, such as a motor vehicle, or also in an airplane.

Provided in a lower, rear region of the backrest 16 is an air-handling device 23. In this example, the air-handling device is a fan 22, which draws air from the environment and conveys it through a flexible bellows 36 to an air distribution structure 32 within the backrest cushion 18 of the backrest 16. From there, the air is conveyed through air ducts 30 to regions near the surface of the backrest 16, where further regions may, for example, be provided with air distribution structures 32 through which the air is conveyed to air outlets 34 or to an air-permeable fabric 40. In the case of leather upholstery, in particular, air outlets 34 only are typically employed. Conversely, in the case of fabric upholstery, an air-permeable fabric 40 through which the air can pass to the outside is used on the surface of the backrest 16.

The fan 22 can take the form, in particular, of an axial fan that draws air in through an air intake opening 26 oriented perpendicular to the rear of the backrest 16 and exhausts it in the same direction through an air outlet 28 toward the flexible bellows 36. The air intake opening 26 defines an intake passage 27 for the air-handling device 23. The bellows 36 is preferably rigidly connected to a fan housing 24 so that the fan 22 can be adequately fixed in the backrest 16 by this connection alone. Alternatively, a radial fan may be used as the air-handling device 23.

At least in a lower region of the backrest 16 near the floor, the rear backrest cover 20 is permeable to the air drawn in by the fan 22. In the example embodiment shown, essentially the entire backrest cover 20 is designed to be air permeable, which is indicated by the plurality of parallel arrows running perpendicular to the rear of the backrest 16. Between the air intake opening 26 of the fan 22 and the backrest cover 20 can be arranged a spacer textile 38 that firstly can ensure better air distribution, even in the radial direction, and secondly can prevent the backrest cover from getting into rotating parts of the fan 22. This spacer textile 38 can take the form of a mesh-type or weave-like knit spacer, which if desired can also accomplish additional attachment of the fan housing 24 in the backrest 16.

The air-distributing and air-directing function of the spacer textile 38 is characterized by a vertical downward arrow that indicates air circulation within the backrest 16 in a radial direction toward the fan 22. Also visible are two arrows perpendicular to a center axis of the fan housing 24, which indicate the radial intake of air through the spacer textile 38 toward the air intake opening 26 of the fan 22. The spacer textile 38 or the knit spacer can accomplish the result that the air conveyed by the fan 22 into the air distribution structures 32 is also drawn in from higher regions and possibly over the full area of the rear of the backrest 16.

The backrest cover 20 can in particular take the form of a woven or knitted textile that is air permeable and opaque. Intake noise from the fan 22 is substantially suppressed due to the large-area air intake through large regions of the rear backrest cover 20, since no resonance-producing air ducts are needed in the intake region. Moreover, the large-area distribution of the air intake ensures that no objectionable drafts are noticeable to the rear seat passengers.

In addition to the functions mentioned, the weave or knit of the backrest cover 20 can fulfill additional functions, for example a filter function to protect the interior spaces of the seat 10 from particles and dust, which could otherwise accumulate in the seat 10 and cause problems after a relatively long period of operation. Moreover, the backrest cover 20 can be designed as a noise-suppressing cover that firstly shields the noises emitted by the fan 22 and secondly can absorb road noise occurring in the vehicle.

A similar air distribution structure is provided in the seat surface 12. Here, too, multiple air ducts 30 are arranged within a seat cushion 14, through which the air that has been drawn in by an air-handling device 23—in particular a fan 22—is conveyed to the surface upon which a person can sit. In regions near the top of the seat surface 12, air distribution structures 32 are provided, each of which communicates with an air duct 30. Here, too, the air can pass to the outside, again through air outlets 34 or through an air-permeable fabric 40. An air distribution structure 32 on the underside of the seat surface 12 communicates at the top with the air ducts 30. At the bottom, it opens into an air outlet of the fan 22, which draws in the air axially from below.

The air conditioning apparatus can be set up to blow ambient air toward the seat surface. It can also be operated in the reverse direction, however, to draw air away from a seated passenger.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A vehicle seat comprising a backrest including a backrest cushion and a rear backrest cover, and an air-handling device associated with the backrest and connected to an air distribution device in the seat, wherein the rear backrest cover is at least partially air permeable and covers at least one passage of the air-handling device, and wherein the air exchanged between the environment and the air-handling device passes to a large extent through the air-permeable regions of the rear backrest cover, the backrest cover being made of textile material.

2. A vehicle seat according to claim 1, wherein the air-handling device includes at least one radial or axial fan arranged in the backrest.

3. A vehicle seat according to claim 2, wherein the at least one fan is located in a lower region of the backrest near a floor of the vehicle.

4. A vehicle seat according to claim 3, wherein at least one lower region of the backrest cover near the vehicle floor is air permeable.

5. A vehicle seat according to claim 3, wherein substantially the entire rear backrest cover is air permeable.

6. A vehicle seat according to claim 1, wherein the backrest cover is made of a woven and knitted textile.

7. A vehicle seat according to claim 1, comprising an air-permeable spacer textile arranged between an air intake opening of the air-handling device and the rear backrest cover of the backrest.

8. A vehicle seat according to claim 7, wherein the air-permeable spacer textile is a knit spacer.

9. A vehicle seat according to claim 1, wherein at least one lower region of the backrest cover near a floor of the vehicle is air permeable.

10. A vehicle seat according to claim 1, wherein substantially the entire rear backrest cover is air permeable.

11. A vehicle seat according to claim 1, wherein the air-permeable region of the rear backrest cover is designed as a dust and particle filter.

12. A vehicle seat according to claim 1, wherein the air-permeable region of the rear backrest cover is designed as a noise-suppressing covering.

13. A vehicle seat according to claim 1 comprising a seating cushion and a second air-handling device connected to a second air distribution device in the seating cushion.

14. An air conditioned seat comprising:
 a backrest having a backrest cushion, a rear backrest cover, a first fan and a first air-distribution device connected to the first fan and located within the backrest cushion;
 a seating cushion having a second fan and a second air-distribution device connected to the second fan and located within the seating cushion; and
 an air-permeable spacer textile arranged between an air intake opening of the first fan and the rear backrest cover,
 wherein the first fan is located in a lower region of the backrest, and wherein a majority of the surface of the backrest cover is air-permeable and covers the air intake opening of the first fan and wherein air drawn into the first fan from the environment passes, to a large extent, through the air permeable regions of the backrest cover.

15. An air conditioned seat according to claim 14, wherein at least one of the first or second fan comprises a radial or axial fan.

16. An air conditioned seat according to claim 14, wherein the backrest cover comprises a dust or particle filter.

* * * * *